(12) United States Patent
Bealkowski et al.

(10) Patent No.: US 9,292,312 B2
(45) Date of Patent: Mar. 22, 2016

(54) SIMULATED NETWORK BOOT ENVIRONMENT FOR BOOTSTRAP REDIRECTION

(75) Inventors: Richard Bealkowski, Redmond, WA (US); Michael R. Turner, Monroe, WA (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 1002 days.

(21) Appl. No.: 13/426,654

(22) Filed: Mar. 22, 2012

(65) Prior Publication Data

US 2013/0254521 A1   Sep. 26, 2013

(51) Int. Cl.
G06F 15/177 (2006.01)
G06F 9/445 (2006.01)
H04L 29/08 (2006.01)
G06F 9/44 (2006.01)

(52) U.S. Cl.
CPC .............. *G06F 9/445* (2013.01); *G06F 9/4416* (2013.01); *H04L 29/08* (2013.01); *H04L 67/141* (2013.01)

(58) Field of Classification Search
None
See application file for complete search history.

(56) References Cited

U.S. PATENT DOCUMENTS

| | | | |
|---|---|---|---|
| 6,463,530 B1 | 10/2002 | Sposato | |
| 6,684,327 B1 | 1/2004 | Anand et al. | |
| 6,810,478 B1 | 10/2004 | Anand et al. | |
| 7,386,711 B1 | 6/2008 | Haimovsky et al. | |
| 7,418,588 B2 | 8/2008 | Lin et al. | |
| 7,664,836 B2 | 2/2010 | Kim | |
| 7,747,847 B2 | 6/2010 | El Zur et al. | |
| 7,979,260 B1 | 7/2011 | Sobel et al. | |
| 8,055,893 B2 | 11/2011 | Locker et al. | |
| 8,104,083 B1 | 1/2012 | Sobel et al. | |
| 2005/0132360 A1 | 6/2005 | Chu et al. | |
| 2006/0129788 A1* | 6/2006 | Maeda et al. | 713/1 |
| 2008/0133794 A1 | 6/2008 | Rothman et al. | |
| 2008/0155245 A1* | 6/2008 | Lipscombe et al. | 713/2 |
| 2009/0013061 A1* | 1/2009 | Winter et al. | 709/222 |
| 2010/0037041 A1 | 2/2010 | Joshi et al. | |
| 2010/0262815 A1* | 10/2010 | Bozek et al. | 713/1 |

OTHER PUBLICATIONS

Chadha, Vineet et al., "Provisioning of Virtual Environments for Wide Area Desktop Grids through Redirect-on-write Distributed File System", 2008 IEEE International Parallel & Distributed Processing Symposium, Apr. 14-18, 2008, 8 pages.
Vallee, Geoffroy et al., "OSCAR Testing with Xen", Proceedings of the 20th International Symposium on High-Performance Computing in an Advanced Collaborative Environment (HPCS'06), May 14-17, 2006, pp. 1-6.

* cited by examiner

*Primary Examiner* — Brian P Whipple
(74) *Attorney, Agent, or Firm* — Katherine S. Brown; Jeffrey L. Strees

(57) ABSTRACT

Mechanisms are provided, in a bare metal computing device, for executing a network based boot operation for booting the bare metal computing device. In response to powering-on the bare metal computing device, firmware is executed that executes a stub from a virtual media image accessible by the bare metal computing device. The configuration information of the bare metal computing device indicates that the bare metal computing device is being booted from a local media. The stub configures the firmware environment and a network boot program to utilize a network connection by modifying the configuration information of the bare metal computing device to indicate that the bare metal computing device is being booted from a network device. A control program is obtained from a remotely located boot server using the network boot program and is executed to complete the booting of the bare metal computing device.

25 Claims, 3 Drawing Sheets

SIMULATED NETWORK BOOT ENVIRONMENT FOR BOOTSTRAP REDIRECTION

BACKGROUND

The present application relates generally to an improved data processing apparatus and method and more specifically to mechanisms for providing a simulated network boot environment for enabling a bootstrap redirection operation.

Computing devices typically, as part of a booting operation, load basic input/output system (BIOS) code for configuring the computing device to load an operating system, and subsequent application code for execution on the computing device. When the computing device first starts up, the first job for the BIOS software is the power-on self-test, which initializes and identifies system devices such as the CPU, RAM, video display card, keyboard and mouse, hard disk drive, optical disc drive, and other hardware. The BIOS then locates boot loader software held on a peripheral device (designated as a 'boot device'), such as a hard disk or a CD/DVD, and loads and executes that software, giving it control of the computing device. This process is known as booting, or booting up, which is short for bootstrapping.

BIOS software is generally stored on a non-volatile memory chip, such as a read only memory (ROM) chip or the like, on the motherboard of the computing device. It is specifically designed to work with each particular model of computer, interfacing with various devices that make up the complementary chipset of the system.

A BIOS has a user interface (UI), typically a menu system accessed by pressing a certain key on the keyboard when the computing device powers on. In the BIOS UI, a user can configure hardware, set the system clock, enable or disable system components, select which devices are eligible to be a potential boot device, set various password prompts, and the like. The BIOS provides a small library of basic input/output functions used to operate and control the peripherals such as the keyboard, text display functions and so forth, and these software library functions are callable by external software.

The role of the BIOS has changed over time. In modern computing devices, the BIOS is being replaced by the more complex Unified Extensible Firmware Interface (UEFI). UEFI is a specification that defines a software interface between an operating system and platform firmware. UEFI is a more secure replacement for the older BIOS firmware interface which is vulnerable to bootkit malware. UEFI can be used in business computers to allow remote diagnostics and repair of computers, even if the operating system will not load.

SUMMARY

In one illustrative embodiment, a method, in a bare metal computing device, for executing a network based boot operation for booting the bare metal computing device is provided. The method comprises, in response to powering-on the bare metal computing device, executing firmware that executes a stub from a virtual media image dynamically mounted and made available to the bare metal computing device. The configuration information of the bare metal computing device indicates that the bare metal computing device is being booted from a local media, or equivalent. The method further comprises configuring, by the stub, a network boot program on the bare metal computing device to utilize a network connection by modifying the configuration information of the bare metal computing device to indicate that the bare metal computing device is being booted from a network device. The method also comprises obtaining a mini control program from a remotely located boot server using the network boot program on the bare metal computing device. Moreover, the method comprises executing the mini control program on the bare metal computing device to complete the booting of the bare metal computing device.

In other illustrative embodiments, a computer program product comprising a computer usable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
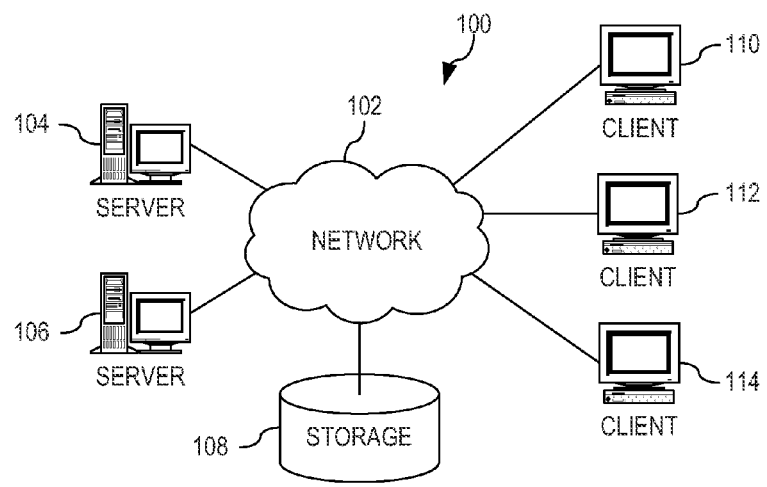
FIG. 1 is an example diagram of a distributed data processing system in which aspects of the illustrative embodiments may be implemented.

The illustrative embodiments provide mechanisms for providing a simulated network boot environment for enabling a bootstrap redirection operation. More specifically, the illustrative embodiments provide mechanisms for configuring bare metal servers by providing a simulated network boot environment for performing bootstrap redirection operations that permit such bare metal servers to be booted from remotely located mini control programs (MCPs), e.g., a Linux kernel or the like, which in turn may be used to remotely load an entire operating system and/or other bootstrap software. In one specific implementation, the mechanisms of the present invention provide a UEFI bootstrap redirection mechanism that boots from a local media, or equivalent, yet creates a simulated network boot environment thereby allowing downstream network boot program(s) to operate properly.

The term "bare metal" in the present context refers to a computing device that does not have a locally resident mini control program (MCP), operating system or hypervisor for booting from a local storage device, or if one is present locally, it is not available for in-band management operations during a bootstrap (i.e., booting or bootup) operation. The term "in-band" refers to actions that are performed while running in a suitable environment on the main processor(s) of the computing device. The term "out-of-band" refers to actions being performed by a co-processor, service processor, or other "helper" processor.

Because a bare metal computing device does not have its own locally resident mini control programs (MCPs) or operating system, it must obtain the necessary software to configure the computing device from an external device, e.g., a floppy disk, CD-ROM, DVD, tape storage, or the like, or obtain the software from a remote location over a communication connection, e.g., a server over a network connection. However, in order to obtain the software over a network connection, the bare metal computing device must be able to generate an in-band environment that permits a network connection to be made possible. However, known mechanisms for booting from remotely located network devices, i.e. network boot program (NBPs), such as iPXE, Extensible Firmware Interface (EFI) Linux Loader ("elilo"), or the like, require that the software used to implement the in-band environment be itself loaded over the network in order for that software to know the identity of the network ports on the bare metal computing device to utilize as well as the location of the source of the remotely located boot software. This represents a "catch-22" situation when it comes to bare metal computing devices that do not have an operating system that informs the NBPs of the network ports that can be used to access remote boot software, e.g., in order for elilo to be able to access a remote server to download boot software, elilo must know the network port to use and will only know that network port if elilo used that network port when it was itself downloaded for execution on the computing device.

In addition, known network boot programs (NBPs) that use known mechanisms, such as Preboot eXecution Environment (PXE), for example, require a Dynamic Host Configuration Protocol (DHCP) server, various DHCP options to be set, and a Trivial File Transfer Protocol (TFTP) server in order to be able to facilitate remote network booting of a computing device. Such mechanisms require dynamic Internet Protocol (IP) address support which eliminates the ability for static IP address computing devices to utilize these mechanisms.

In view of the above, one of the primary issues addressed by the illustrative embodiments is how to load a mini control program (MCP), such as an operating system kernel or the like, reliably and quickly over one or more of the network ports of a bare metal computing device. The illustrative embodiments provide mechanisms for simulating a network boot environment that makes the NBP believe, based on its configuration information, that the NBP was loaded from a remotely located computing device over a network connection.

In one illustrative embodiment, the bare metal computing device is configured to have a stub, a corresponding minimum footprint configuration file for configuring the stub, and a firmware boot code, such as basic input/output system (BIOS) or Unified Extensible Firmware Interface (UEFI), for example. The stub is a very small portion of code that stands in for some programming functionality. When the bare metal computing device is powered on, the UEFI code is executed from the firmware of the bare metal computing device. The UEFI code is configured to load the stub into memory along with the minimum footprint configuration file which configures the stub with a network port over which to communicate as well as other network configuration information that configures the stub to utilize a network interface and access remotely located bootstrap programs for booting the bare metal computing device. The stub and configuration file may be part of a local media image, e.g., floppy disk image, a virtual floppy disk image, hard disk image, or the like, in memory or other storage of the bare metal computing device.

The local media image or equivalent may further store a first NBP that the bare metal computing device can use to access remotely located bootstrap software via a network communication connection. Alternatively, the first NBP may be remotely obtained from a remotely located server via a network connection configured by the stub using its configuration file. The first NBP may be, for example, in one illustrative embodiment, the iPXE application. The first NBP may be configured by the stub to specify a network port to be used for network communication, a type of addressing mode to be used, e.g., dynamic or static addresses, netmask information, optional gateway address information, and/or the like. The first NBP may further be configured with an identification of one or more second and subsequent NBPs and their network location of these one or more second and subsequent NBPs. These second and subsequent NBPs may be loaded from the remote server into local memory and executed to facilitate the downloading and execution of additional boot software from the remote boot server.

Essentially, the stub permits a network boot environment to be created on the bare metal computing device to make it appear as though the bare metal computing device has started a network based boot process such as those conforming with the PXE process when in fact the boot process initiated using a local virtual media image. The stub replaces the configuration of the bare metal computing device, which indicates a locally initiated boot process, to cause the bare metal computing device to indicate that it was booted from a network boot server when in fact it was booted from a local virtual media image. Thereafter, a network boot program may be used to access a remotely located mini control program and other bootstrap software using the network aware configuration of the bare metal computing device. As a result, a network based bootstrap operation may be performed for booting a bare metal computing device.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments may be utilized in many different types of data processing environments. Essentially, any computer system that uses bare metal booting of a control program, such as a hypervisor, operating system, or the like, may make use of the mechanisms of the illustrative embodiments described herein. The bare metal booting (or bootstrap) operation in accordance with the illustrative embodiments is performed using a local virtual media image that simulates a network boot environment which in turn permits the bare metal computing system/device to complete its bootstrap operation using remotely located mini control programs and other bootstrap applications on a boot server or other remotely located computing device. The term "remote" or "remotely located" as it is used herein refers to a computing device that is accessible only through one or more data networks and not by direct local connection.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example and may be bare metal computing devices in accordance with the illustrative embodiments. As such, the clients 110, 112, and 114 may initiate a bootstrap operation locally using a local virtual media image and complete the bootstrap operation using a mini control program and other bootstrap applications obtained from one or more of the servers 104, 106 via the network 102. One or more of the servers 104, 106 or clients 110, 112, 114 may further provide a management application for managing the bootstrap operation being performed on one or more bare metal computing devices, such as one or more of the clients 110, 112, and 114. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
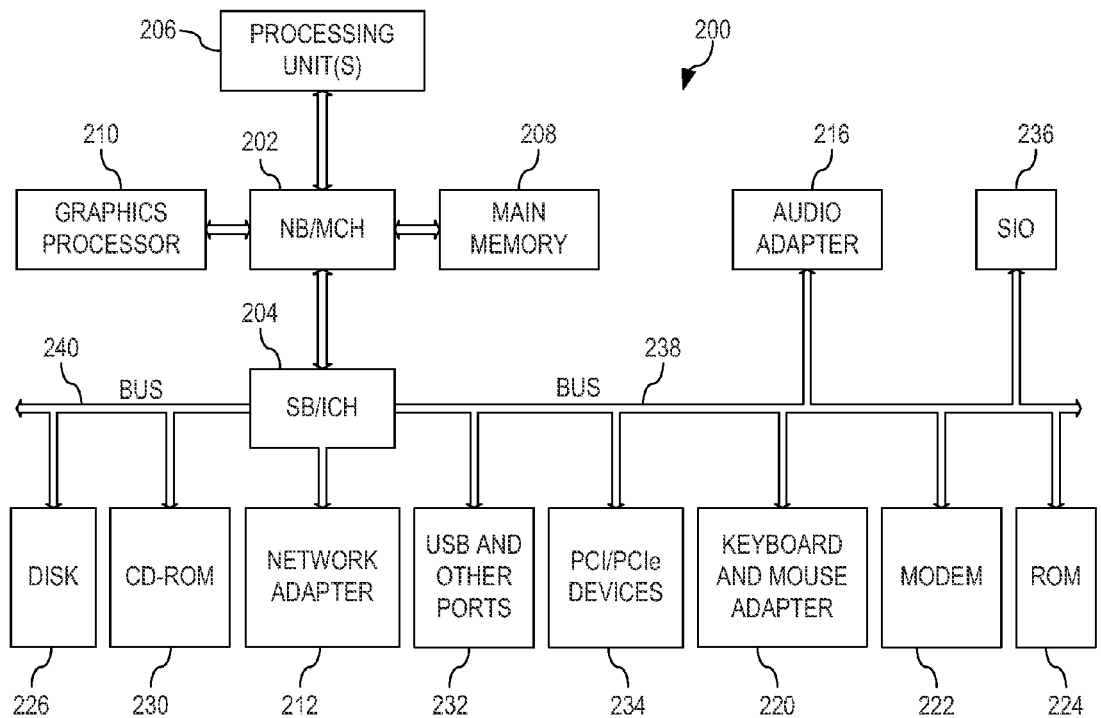
FIG. 2 is an example diagram of a computing device in which aspects of the illustrative embodiments may be implemented.

FIG. 2 is a block diagram of an example data processing system in which aspects of the illustrative embodiments may be implemented. In one aspect of the illustrative embodiments, data processing system 200 is an example of a bare metal computing system/device, such as client 110 in FIG. 1, in which computer usable code or instructions, implementing the processes described hereafter with regard to a bare metal computing system/device operations, may be executed. In another aspect of the illustrative embodiments, the data processing system 200 may further be a server computing device, such as server 104 or 106 in FIG. 1, which provides a management application for controlling the network based bootstrap operation of a bare metal computing system/device. Still further, the data processing system may be a server computing device, such as server 104 or 106 in FIG. 1, which provides a mini control program and other bootstrap applications to a bare metal computing system/device via a network or the like.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

In the case of a server computing system, such as server 104 or 106 in FIG. 1, an operating system may run on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

With reference again to FIG. 1, one or more of the clients 110, 112, and 114 may be a bare metal computing device that does not necessarily have its own local hypervisor, operating system, or the like. Using the mechanisms of the illustrative embodiments, the clients 110, 112, and 114 may have a local virtual media image from which a stub is executed using its locally stored configuration information and a network boot program (NBP) to establish a network boot environment. Using this network boot environment, the stub causes communication with a remote server, such as server 104 or 106, to obtain a mini control program (MCP) that is able to be used to continue the bootstrap operation using remotely located bootstrap applications on the remotely located server 104 or 106. One of the servers 104 or 106 may provide a management application that controls or orchestrates the network bootstrap process for one or more bare metal computing devices in accordance with the illustrative embodiments.

It should be appreciated that while the illustrative embodiments are described above with regard to network bootstrapping a bare metal computing device that is a client computing device, the illustrative embodiments are not limited to such. Rather, the mechanisms of the illustrative embodiments may be used to network bootstrap any bare metal computing device. For example, in one illustrative embodiment, the bare metal computing device may be a blade server system having a plurality of blade servers. Each blade server may correspond to a different bare metal computing device or the blade server system as a whole may be treated as the bare metal computing device for purposes of the operation of the illustrative embodiments. Any bare metal computing device may be booted and configured using the mechanisms of the illustrative embodiments.

Figure 3:
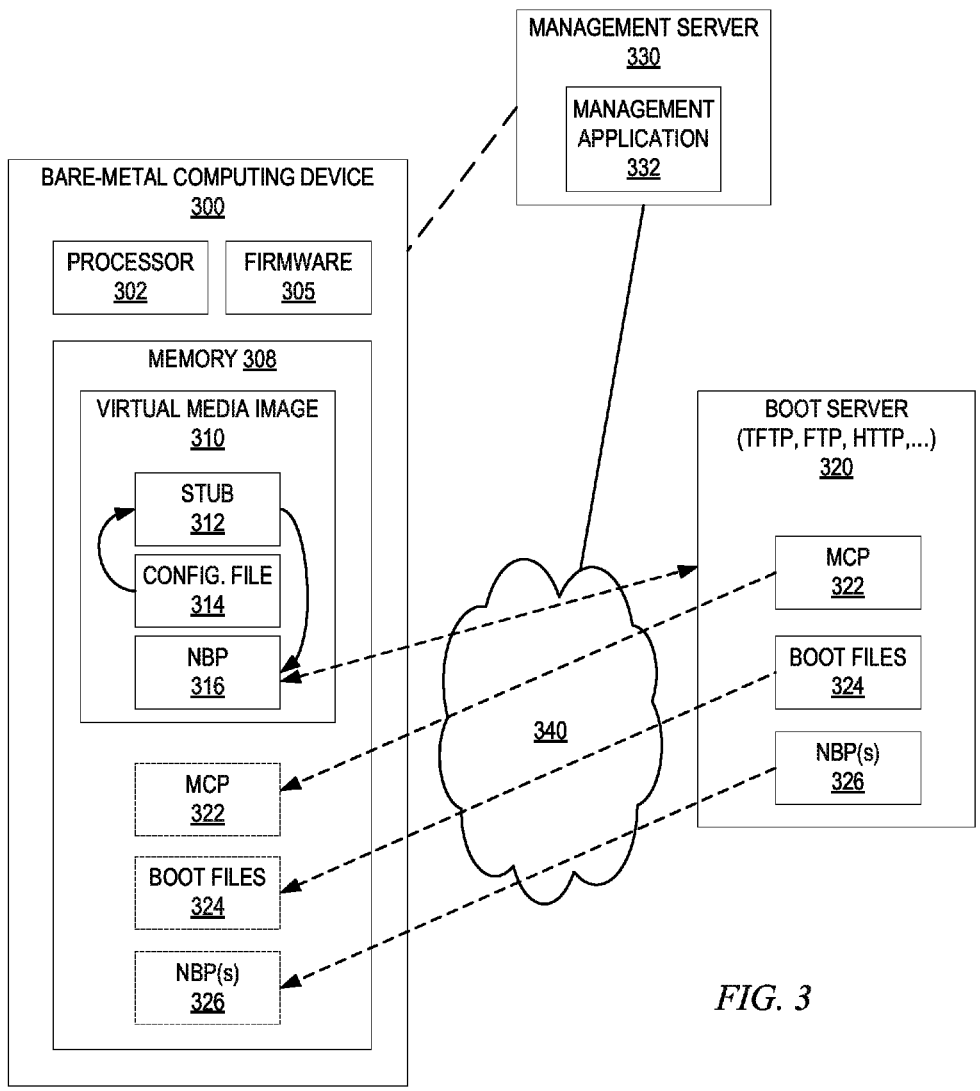
FIG. 3 is a block diagram illustrating the primary operational elements of a system for remote booting of a bare metal computing device in accordance with one illustrative embodiment.

To better illustrate the mechanisms and their operation in accordance with the illustrative embodiments, FIG. 3 is provided hereafter which illustrates the primary operational elements for performing a network bootstrap operation of a bare metal computing device in accordance with the illustrative embodiments. As shown in FIG. 3, the bare metal computing device comprises firmware 305 and a virtual media image 310 accessible via local, remotely mounted, or attached storage, and which may be loaded into memory 308 of the bare metal computing device 300. The bare metal computing device 300, after being configured with a simulated network environment in accordance with the illustrative embodiments, communicates with a remotely located boot server 320, or file server, that holds control program files used for a bootstrap operation, via one or more networks 340 to obtain a mini control program 322, boot files 324, and one or more network boot programs (NBPs) 326 from the boot server 320. A management server 330 may be provided that provides a management application or utility 332 that orchestrates the network booting of the bare metal computing device 300.

Initially, the bare metal computing device 300 has no software mechanisms, other than firmware 305 which provides a basic set of input/output software for facilitating communication with the hardware of the bare metal computing device 300, resident in the bare metal computing device 300 and must be configured with software to be executed upon power-up of the bare metal computing device 300. This is the purpose of the management application 332. It should be appreciated that while the depicted example illustrates the management application 332 being resident on a separate server computing device, i.e. the management server 330, the management application 332 may be provided on a different computing device. For example, in one illustrative embodiment, the management application 332 may be executed by a service processor (not shown) that is associated with the bare metal computing device 300. For example, in a blade server system, the bare metal computing device 300 may be one of the blades in the blade server system while the service processor may be a separate processor within the blade server system that operates to manage and configure the blades in the blade server system.

The management application 332 may be executed initially for the purpose of performing out-of-band (OOB) queries to determine the presence of one or more bare metal computing devices 300 as well as the network port(s) to be used on the bare metal computing device 300 to perform communications via the network 340. Management application 332 may select the bare metal computing devices 300 and associated network connectivity 340 via interaction with a system administrator via a program user interface (UI) or by rules or other selection criteria stored in association with management application 332, for example. The stored rules or criteria can be defaults or specific selections determined by a system administrator operating management application 332, for example. The management application 332 further configures the bare metal computing device's firmware 305 with a boot list indicating the device, or series of devices, from which to initially boot the bare metal computing device 300. In accordance with the mechanisms of the illustrative embodiments, the management application 332 configures the boot list in the firmware 305 of the bare metal computing device 300 to identify a local virtual media image 310 as the initial boot device for the bare metal computing device 300.

The firmware 305 stores an initial code that is executed when the bare metal computing device 300 is powered on, e.g., a basic input/output system (BIOS), Unified Extensible Firmware Interface (UEFI), or the like. In one illustrative embodiment, the firmware 305 is UEFI stored on a flash memory built-in to the bare metal computing device. The management application 332 configures the UEFI of the firmware 305 to boot from the local virtual media image 310 and thus, when the bare metal computing device 300 is powered on and begins its bootstrap operation, the bare metal computing device 300 is configured to know that it is being booted locally. As a result, without modification by the mechanisms of the illustrative embodiments, the bare metal computing device 300 would not be configured to complete its bootstrap operation via a network based boot server.

The management application 332 further creates a virtual media image 310 on the bare metal computing device 300 from which the bare metal computing device 300 can begin its bootstrap operations. The virtual media image 310 comprises a stub 312, a configuration file 314, and a first network boot program (NBP) 316. The virtual media image 310 is a representation of a local media, such as a floppy diskette, CD-ROM, DVD-ROM, or the like. The virtual media image 310 simulates a local media from which the bare metal computing device may be booted.

The stub 312 is a very small portion of code that stands in for some programming functionality. When the bare metal computing device is powered on, the UEFI code in the firmware 305 is executed. The UEFI code has been configured by the management application 332 to load the stub 312 into memory 308 along with the minimum footprint configuration file 314 which configures the stub 312 with a network port of a local network interface card (NIC) or the like over which to communicate with the network 340, as well as other network configuration information, such as an address for the bare metal computing device to be used (for static IP addresses) or to use a dynamic address mechanism (e.g., DLICP or the like), an address of the boot server 320, and/or the like. Thus, through the configuring of the stub 312 to operate in a network environment defined by the network port and address information, the bare metal computing device 300 is able to access the network 340.

As shown in FIG. 3, the local virtual media image 310 may further store a first NBP 316 that the bare metal computing device can use to access remotely located bootstrap software on the boot server 320 via the network communication connection to the network 340. Alternatively, the first NBP 316 may be remotely obtained from a remotely located server 320 via a network connection configured by the stub 312 using its configuration file 314. The first NBP 316 may be, for example, in one illustrative embodiment, the iPXE application. The first NBP 316 may be configured by the stub 312 to specify a network port to be used for network communication, a type of addressing mode to be used, e.g., dynamic or static addresses, netmask information, optional gateway address information, and/or the like. The first NBP 316 may further be configured with an identification of one or more second and subsequent NBPs 326 and their network location of these one or more second and subsequent NBPs 326, e.g., on boot server 320. These second and subsequent NBPs 326 may be loaded from the remote server into local memory 308 and executed to facilitate the downloading and execution of additional boot software 324 from the remote boot server 320.

Essentially, the stub 312 permits a network boot environment to be created on the bare metal computing device 300 to make it appear as though the bare metal computing device 300 has started a network based boot process when in fact the boot process initiated using a local virtual media image 310. The stub 312 replaces the configuration of the bare metal computing device 300, which indicates a locally initiated boot process, to cause the bare metal computing device 300 to indicate that it was booted from a network boot server 320 when in fact it was booted from a local virtual media image 310. Thereafter, a network boot program 316, or series of network boot programs 316, 326, may be used to access a remotely located mini control program (MCP) 322, such as an operating system kernel or the like, and other bootstrap software 324 using the network aware configuration of the bare metal computing device 300. As a result, a network based bootstrap operation may be performed for booting a bare metal computing device 300.

For example, in one illustrative implementation, the firmware 305 (e.g., UEFI) is configured to load the stub 312 from the local virtual media image 310, which in turn reads its configuration file 314 which was created and written to the local virtual media image 310 by the management application 332. The virtual media image 310 further comprises a first NBP 316, such as iPXE, which is loaded by the stub 312 into memory 308. The stub 312 dynamically patches the first NBP 316, e.g., iPXE, to modify its internal sequence of commands, or script, to comprise a series of commands for accessing the network port and the remotely located boot server 320 to download the MCP 322, the boot files 324, and/or the second NBP 326 from the remotely located boot server 320. This internal sequence of commands, or script, informs the first NBP 316, e.g., iPXE, which network port to use (such as by specification of a MAC address or the like), an IP address, netmask, and optional gateway address for static IP modes of operation, or an indication of dynamic IP address mode if a DHCP mode is to be used.

The command sequence of the first NBP 316, after patching by the stub 312, may further include an indication of one or more subsequent NBPs, e.g., second NBP 326, to be used and where and how to download the one or more subsequent NBPs 326. For example, the second NBP 326 may be the elilo.efi network boot program which is used to load the MCP 322 or other operating system from boot server 320. For example, the stub 312 may configure the iPXE network boot program to obtain the executable elilo.efi file via the network 340 using the address ftp://[FTP Server Address]/[elilo path], such as ftp://192.168.70.5/elilo.efi. Of course many variations are supported by the mechanisms of the illustrative embodiments. For example, rather than using file transfer protocol (ftp), other protocols including tftp or http may be used. In addition a user identifier and password may be provided, such as ftp://userid:password@192.168.70.5/maint/elilo-uldr.efi. The elilo.efi executable may then obtain its configuration file, such as may be included in boot files 324, from the same location it was loaded from. The configuration file for elilo.efi, or more generally the second NBP 326, may be generated and stored in the boot server 320 by the management application 332, for example, as part of an initial set of out-of-band (OOB) operations for configuring the system as a whole for network booting of bare metal computing devices.

Thus, the stub 312 is configured by the configuration file to configure the bare metal computing device 300 to utilize network connections with the network 340 to connect to a boot server 320 and to initiate a first NBP 316. In essence, the stub 312 operates to replace the NBP's loaded image control (or configuration) data that indicates a local bootstrap operation, to have a simulated network environment using the configuration file 314 associated with the stub 312. The stub 312 executes the first NBP 316 (e.g., iPXE) which communicates with the boot server 320 to download a second NBP 326 (e.g., elilo.efi) and execute it on the bare metal computing device 300. The second NBP 326 downloads a mini control program (MCP) 322 (operating system kernel, such as a Linux kernel or the like) from the boot server 320. The MCP 322 executes on the bare metal computing device 300 to download additional boot files 324 and execute operations on the bare metal computing device 300 to configure the bare metal computing device 300 for execution of an operating system and applications. Once the MCP 322 completes its initialization of the bare metal computing device 300, it signals that that the bare metal computing device 300 is ready for applications to be executed on the bare metal computing device 300 and the virtual media image 310 is then unmounted. That is, the boot sequence associated with the firmware 305 is modified to return to an original boot sequence to enable local booting of the bare metal computing device again and removing indications that the bare metal computing device was booted from a remote boot server.

Figure 4:
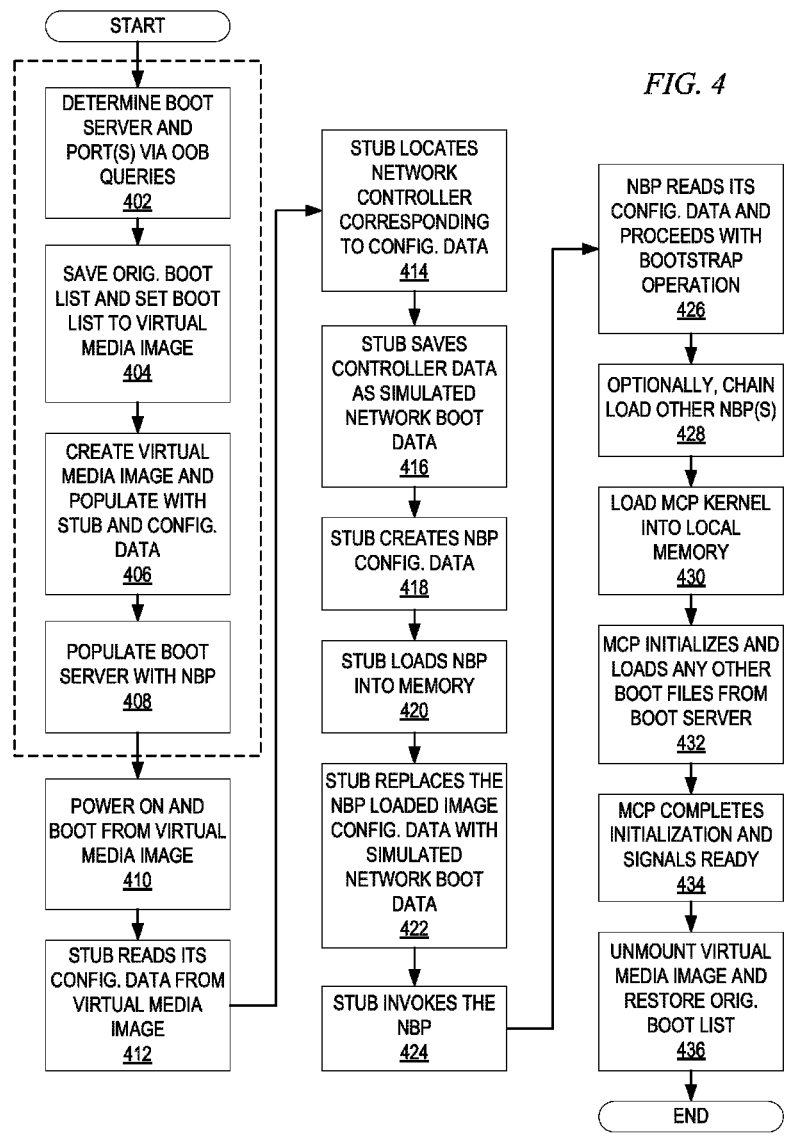
FIG. 4 is a flowchart outlining an example operation for booting a bare metal computing device from a network boot server in accordance with one illustrative embodiment.

FIG. 4 is a flowchart outlining an example operation for booting a bare metal computing device from a network boot server in accordance with one illustrative embodiment. As shown in FIG. 4, the operation starts with a number of preliminary operations being performed so that configuration data and virtual media images may be generated to allow network based booting of a bare metal computing device in accordance with the illustrative embodiments. While these operations are shown in FIG. 4 as part of the overall operation, these operations, i.e. operations 402-408 may be performed separate from the remaining operations at a remote time from the time the other operations 410-436 are performed. Moreover, these operations 402-408 may be performed by one or more separate software programs and one or more separate data processing devices, such as service processors, or the like.

As shown in FIG. 4, as part of these preliminary operations, which may be performed by the management application, such as management application 332 of management server 330, an out-of-band (OOB) determination of the boot server to be utilized and the network ports to be utilized for booting the bare metal computing device is performed, such as by a service processor or the like generating OOB queries to one or more computing devices with those computing devices responding with the requested information, e.g., the network port information and boot server address information (step 402). A boot list is stored in the bare metal computing device (BMCD) that identifies the device from which to boot the bare metal computing device, or an order of devices from which to attempt to boot the bare metal computing device (step 404). This boot list is the normal boot list that the bare metal computing device would utilize absent the mechanisms of the illustrative embodiments being implemented on the bare metal computing device. The boot list is set to boot the bare metal computing device from a virtual media image, e.g., a floppy diskette image accessed via locally accessible memory or storage device of the bare metal computing device, by a management application 332, for example. This causes the bare metal computing device to begin its bootstrap operation using the stub, configuration information, and network boot program stored in this virtual media image.

As another preliminary operation for setting up the system for network booting of a bare metal computing device, the management application may further create the virtual media image for the bare metal computing device and populate it with the stub and configuration information (step 406). The bare metal computing device is further populated with a first network boot program (NBP) which may be later configured by the stub as described above (step 408). The first NBP may be, for example, the iPXE boot program, and may be provided as part of the virtual media image, for example. In addition, although not explicitly shown in FIG. 4, the management program may configure a second NBP on a remotely located boot server for use with remote booting of bare metal computing devices (BMCDs).

Having configured the BMCD for initial power up, the BMCD is powered on causing the firmware, e.g., UEFI, to operate and initially start booting the BMCD from the virtual media image local to the BMCD (step 410). The virtual media image comprises a stub which is executed and which reads its network configuration information from a corresponding configuration file of the virtual media image (step 412). Based on this network configuration information, e.g., MAC address, port address, etc., the stub locates its local network controller, e.g., NIC card (step 414). The stub saves the network controller configuration information as a simulated network boot environment data (step 416) and creates network boot program (NBP) configuration data for the first NBP to utilize in connecting to the network (step 418). The stub loads the NBP from the virtual media image into memory (step 420) and replaces the NBPs loaded image control data (or configuration data), which indicates that the NBP was not loaded over a network connection since it was loaded from a local media (the local virtual media image), with the simulated network boot environment data (step 422). For UEFI-based bare metal computing devices, for example, the management of the loaded image control data of the NBP includes modifying the LoadedImage->DeviceHandle and LoadedImage->FilePath values contained within UEFI data structures to values that indicate network operation over the selected port. This in effect tells the NBP that it was loaded over a network connection when in fact it was not, thereby simulating the network environment for the NBP to use.

The stub then invokes the NBP (step 424) which reads its control data (configuration data), which is the simulated network boot environment data, and the NBP proceeds with a network bootstrap operation (step 426). Other NBPs may be remotely located, downloaded, configured, and utilized to assist in this network bootstrap operation, although this is optional and not a requirement for proper operation of the mechanisms of the illustrative embodiments (step 428). As part of the network bootstrap operation, a mini control program (MCP) is downloaded from a remote boot server (step 430) and executed on the BMCD (step 432). The execution of the MCP, which may be an operating system kernel, such as a Linux kernel or the like, for example, may involve the downloading of boot files from the boot server and execution of these boot files. The MCP then completes its initialization of the BMCD by executing these boot files and then signaling that the BMCD is ready for execution of applications (step 434). The virtual media image is then unmounted and the BMCD's boot list in the firmware is restored to its original state so that booting is performed from a local media (step 436). The operation then terminates.

Thus, the mechanisms of the illustrative embodiments facilitate network based booting of a bare metal computing device. The mechanisms of the illustrative embodiments initially begin the boot sequence locally using a virtual media image and then simulates a network boot environment such that network boot programs may be utilized to complete the booting of the bare metal computing device from a remotely located boot server. This avoids the problems associated with network boot programs not being able to access a network connection unless they themselves are loaded over that network connection and the further problem associated with attempting to utilize such mechanisms on a bare metal computing device that does not necessarily have an operating system or the like that would inform such a network boot program of network hardware that is present in the bare metal computing device.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a bare metal computing device, for executing a network based boot operation for booting the bare metal computing device, comprising:
    in response to powering-on the bare metal computing device, executing firmware, on the bare metal computing device, that executes a stub from a local media image stored on the bare metal computing device, wherein configuration information in a configuration file stored on the bare metal computing device indicates that the bare metal computing device is being booted from a local medium associated with the bare metal computing device;
    configuring, by the stub, a network boot program stored on the bare metal computing device to utilize a network connection by modifying the configuration information of the bare metal computing device to indicate that the bare metal computing device is being booted from a network device, wherein the network boot program is already stored on the bare metal computing device at powering-on the bare metal computing device;
    obtaining, by the bare metal computing device, a control program from a remotely located boot server using the network boot program stored on the bare metal computing device; and
    executing the control program on the bare metal computing device to complete the booting of the bare metal computing device.

2. The method of claim 1, wherein the stub dynamically patches the network boot program to modify the network boot program's internal sequence of commands to comprise a series of commands for accessing the network port specified in the configuration information of the configuration file, and for accessing the remotely located boot server to download the control program.

3. The method of claim 1, wherein executing the control program on the bare metal computing device to complete the booting of the bare metal computing device comprises:
    downloading, by the control program, a second network boot program from the remotely located boot server; and
    executing the second network boot program on the bare metal computing device to download and execute one or more additional boot files.

4. The method of claim 3, wherein the second network boot program is an Extensible Firmware Interface Linux Loader boot program.

5. The method of claim 1, wherein the configuration file further specifies at least one of an Internet Protocol address, netmask, and optional gateway address for a static Internet Protocol address of the remotely located boot server, or an indication to obtain a dynamic Internet Protocol address of the remotely located boot server.

6. The method of claim 1, wherein the local media image further comprises a configuration file for configuring the stub with network configuration information including a network port identifier over which the bare metal computing device communicates with the remotely located boot server and a network address of the remotely located boot server.

7. The method of claim 1, wherein configuring the network boot program comprises configuring the network boot program based on the configuration information in the configuration file of the local media image.

8. The method of claim 1, wherein the network boot program is a Preboot eXecution Environment boot program.

9. The method of claim 1, wherein the firmware is a Unified Extensible Firmware Interface.

10. The method of claim 1, wherein the bare metal computing device is a blade in a blade server, and wherein the method is initiated and orchestrated by a management application executing on a service processor associated with the blade server.

11. A computer program product comprising a non-transitory computer readable storage medium having a computer readable program stored therein, wherein the computer readable program, when executed on a bare metal computing device, causes the bare metal computing device to:
    execute, in response to powering-on the bare metal computing device, firmware that executes a stub from a local media image stored on the bare metal computing device, wherein configuration information in a configuration file stored on the bare metal computing device indicates that the bare metal computing device is being booted from a local medium associated with the bare metal computing device;
    configure, by the stub, a network boot program stored on the bare metal computing device to utilize a network connection by modifying the configuration information of the bare metal computing device to indicate that the bare metal computing device is being booted from a network device, wherein the network boot program is already stored on the bare metal computing device at powering-on the bare metal computing device;
    obtain, by the bare metal computing device, a control program from a remotely located boot server using the network boot program stored on the bare metal computing device; and
    execute the control program on the bare metal computing device to complete the booting of the bare metal computing device.

12. The computer program product of claim 11, wherein the stub dynamically patches the network boot program to modify the network boot program's internal sequence of commands to comprise a series of commands for accessing the network port specified in the configuration information of the configuration file, and for accessing the remotely located boot server to download the control program.

13. The computer program product of claim 11, wherein the computer readable program causes the bare metal computing device to execute the control program on the bare metal computing device to complete the booting of the bare metal computing device by:
    downloading, by the control program, a second network boot program from the remotely located boot server; and
    executing the second network boot program on the bare metal computing device to download and execute one or more additional boot files.

14. The computer program product of claim 13, wherein the second network boot program is an Extensible Firmware Interface Linux Loader boot program.

15. The computer program product of claim 11, wherein the configuration file further specifies at least one of an Internet Protocol address, netmask, and optional gateway address for a static Internet Protocol address of the remotely located boot server, or an indication to obtain a dynamic Internet Protocol address of the remotely located boot server.

16. The computer program product of claim 11, wherein the local media image further comprises a configuration file for configuring the stub with network configuration information including a network port identifier over which the bare metal computing device communicates with the remotely located boot server and a network address of the remotely located boot server.

17. The computer program product of claim 11, wherein configuring the network boot program comprises configuring the network boot program based on the configuration information in the configuration file of the local media image.

18. The computer program product of claim 11, wherein the network boot program is a Preboot eXecution Environment boot program.

19. The computer program product of claim 11, wherein the firmware is a Unified Extensible Firmware Interface.

20. The computer program product of claim 11, wherein the bare metal computing device is a blade in a blade server, and wherein the method is initiated and orchestrated by a management application executing on a service processor associated with the blade server.

21. A bare metal computing device, comprising:
a processor;
memory coupled to the processor; and
a network controller coupled to the processor, wherein the processor, in response to power-on of the bare metal computing device:
executes firmware in the memory that executes a stub from a virtual media image stored on the bare metal computing device, wherein configuration information in a configuration file stored on the bare metal computing device indicates that the bare metal computing device is being booted from a local media;
configures, by the stub, a network boot program stored on the bare metal computing device to utilize a network connection of the network controller by modifying the configuration information of the bare metal computing device to indicate that the bare metal computing device is being booted from a network device, wherein the network boot program is already stored on the bare metal computing device at powering-on the bare metal computing device;
obtain a control program from a remotely located boot server using the network boot program on the bare metal computing device; and
execute the control program on the bare metal computing device to complete the booting of the bare metal computing device.

22. The bare metal computing device of claim 21, wherein the stub dynamically patches the network boot program to modify the network boot program's internal sequence of commands to comprise a series of commands for accessing the network port specified in the configuration information of the configuration file, and for accessing the remotely located boot server to download the control program.

23. The bare metal computing device of claim 21, wherein the bare metal computing device executes the control program on the bare metal computing device to complete the booting of the bare metal computing device by:
downloading, by the control program, a second network boot program from the remotely located boot server; and
executing the second network boot program on the bare metal computing device to download and execute one or more additional boot files.

24. The bare metal computing device of claim 23, wherein the network boot program is a Preboot eXecution Environment boot program, the firmware is a Unified Extensible Firmware Interface, and the second network boot program is an Extensible Firmware Interface Linux Loader boot program.

25. The bare metal computing device of claim 21, wherein the local media image further comprises a configuration file for configuring the stub with network configuration information including a network port identifier over which the bare metal computing device communicates with the remotely located boot server and a network address of the remotely located boot server.

* * * * *